United States Patent
Spackman et al.

(10) Patent No.: US 8,843,306 B1
(45) Date of Patent: Sep. 23, 2014

(54) AIRSPACE FIX FORMATION DISPLAY

(71) Applicant: The Boeing Company, Chicago, IL (US)

(72) Inventors: Steven Curtis Spackman, Aurora, CO (US); Theodore Bruce Thompson, Highlands Ranch, CO (US); Jeffrey L. Williams, Parker, CO (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 13/687,732

(22) Filed: Nov. 28, 2012

(51) Int. Cl.
*G06F 17/00* (2006.01)
*G06F 19/00* (2011.01)
*G01C 21/00* (2006.01)
*G08G 5/00* (2006.01)

(52) U.S. Cl.
CPC ..................................... *G01C 21/00* (2013.01)
USPC ........... 701/409; 701/410; 701/412; 701/426; 701/454; 340/945; 340/971; 340/995.14; 340/995.27

(58) Field of Classification Search
USPC ......... 701/400, 408, 409, 410, 411, 417, 418, 701/425, 426, 428, 454, 459, 460, 466, 467, 701/468, 472, 489, 492, 528, 532, 533, 538, 701/300, 302; 340/945, 947, 971, 973, 977, 340/979, 988, 995.1, 995.14, 995.15, 340/995.17, 995.19, 995.23, 995.25, 340/995.26, 995.27
See application file for complete search history.

(56) References Cited

U.S. PATENT DOCUMENTS

| 4,413,322 | A | 11/1983 | Foster et al. |
| 4,590,569 | A | 5/1986 | Rogoff et al. |
| 4,692,869 | A | 9/1987 | King et al. |
| 6,314,362 | B1 * | 11/2001 | Erzberger et al. ............. 701/120 |
| 7,693,621 | B1 * | 4/2010 | Chamas ......................... 701/16 |
| 2010/0131126 | A1 | 5/2010 | He et al. |
| 2011/0010082 | A1 * | 1/2011 | Wilson et al. ................. 701/200 |

* cited by examiner

*Primary Examiner* — Thomas Tarcza
*Assistant Examiner* — Edward Pipala
(74) *Attorney, Agent, or Firm* — Yee & Associates, P.C.

(57) ABSTRACT

A method and apparatus for displaying an aircraft fix. A fix for an aircraft is identified, wherein the fix is a location of the aircraft. A fix identifier is displayed in a plan view display, wherein the fix identifier indicates a location of the fix on a map background in the plan view display. A fix formation identifier is displayed in the plan view display, wherein the fix formation identifier indicates a direction from a navigational aid to the fix.

20 Claims, 6 Drawing Sheets

AIRSPACE FIX FORMATION DISPLAY

BACKGROUND INFORMATION

1. Field

The present disclosure relates generally to aircraft navigation and to displaying information for aircraft navigation. More particularly, the present disclosure relates to displaying information identifying various characteristics of a fix for an aircraft to an operator of the aircraft.

2. Background

In position fixing navigation, a fix is a position derived from measuring external reference points. A fix also may be referred to as a positional fix. The term is generally used with reference to manual or visual techniques for identifying the position of a vehicle. For example, a fix may be identified using intersecting visual or radio position lines.

A visual fix may be made using a sighting device with a bearing indicator. Two or more objects of known position may be sighted from a vehicle using the device and the bearings recorded. Bearing lines then may be plotted on a chart through the locations of the sighted objects. The intersection of these bearing lines indicates the current position of the vehicle.

Radio frequency signals may be used to identify a fix indicating a geographic location of an aircraft. For example, very high frequency, VHF, omnidirectional range, VOR, is an example of a type of radio navigation system for aircraft. This system enables the pilot of an aircraft to determine the current position of the aircraft and to stay on course using radio signals transmitted by a network of fixed ground radio beacons and received by a receiver unit on the aircraft.

For conventional aircraft navigation, in instrument conditions, it may be desirable to identify fixes for an aircraft using instruments tuned to ground-based navigational aids transmitting radio navigation signals. Therefore, systems for providing fix information supporting conventional navigation using such ground-based navigational aids may be desirable.

Accordingly, it would be beneficial to have a method and apparatus that takes into account one or more of the issues discussed above as well as possibly other issues.

SUMMARY

A first illustrative embodiment provides a method for displaying an aircraft fix. A fix for an aircraft is identified, wherein the fix is a location of the aircraft. A fix identifier is displayed in a plan view display, wherein the fix identifier indicates a location of the fix on a map background in the plan view display. A fix formation identifier is displayed in the plan view display, wherein the fix formation identifier indicates at least one of a distance and a direction from a navigational aid to the fix.

Another illustrative embodiment provides an apparatus comprising a fix identification system and a display generator. The fix identification system is configured to identify a fix for an aircraft, wherein the fix is a location of the aircraft. The display generator is configured to display a fix identifier and a fix formation identifier in a plan view display. The fix identifier indicates a location of the fix on a map background in the plan view display. The fix formation identifier indicates at least one of a distance and a direction from a navigational aid to the fix.

Another illustrative embodiment provides an aircraft fix information display comprising a plan view display, an ordered fix information display, and a profile view display. The plan view display comprises a first fix identifier indicating a location of a fix on a map background and a fix formation identifier indicating at least one of a distance and a direction from a navigational aid to the fix, wherein the fix is a location of the aircraft. The ordered fix information display comprises a display of fix information for the fix in a desired order. The profile view display comprises a second fix identifier indicating an altitude of the aircraft at the fix in the profile view display.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number," as used herein with reference to items, means one or more items. For example, "a number of different considerations" means one or more different considerations.

The different illustrative embodiments recognize and take into account that current navigation displays on aircraft may not provide the functionality desirable for conventional navigation using radio signals received from ground-based navigational aids. Currently, conventional navigation using such radio signals may use paper charts or static images of paper charts imported into the navigation displays to identify fixes for the aircraft.

In accordance with an illustrative embodiment, fix information for an aircraft may be provided to an operator of the aircraft on a variety of integrated and interactive displays. Information identifying various characteristics of a fix may be displayed. Information identifying restrictions and limitations associated with a fix also may be displayed.

In accordance with an illustrative embodiment, fix information may be displayed to an operator of an aircraft in one or more of a plan view display, an ordered fix information display, and a profile view display. Fix information may be displayed in the ordered fix information display in the order in which the fixes are flown by the aircraft. Fix information displayed in the ordered fix information display may include textual descriptions of the fix formations, restrictions, and limitations associated with the fix.

Identifiers may be used to indicate the fixes in the various displays. In accordance with an illustrative embodiment, the aircraft operator may select a particular fix of interest by interaction with any display in which the fix is identified. Identifiers corresponding to the selected fix may be highlighted in each of the various displays. A pop-up box may be displayed in the map plan view in response to an operator selecting a particular fix of interest. The pop-up box may include information for the selected fix displayed both textually and graphically to aide in the identification of the fix as well as any restrictions and limitations associated with the fix.

In accordance with an illustrative embodiment, fix formations for the selected fix may be indicated in the plan view display by distinct lines graphically depicting the fix formations. For example, such lines may be used to indicate the directions from the fix to the ground-based systems from which radio signals will be received when the aircraft is located at the selected fix.

Figure 1:
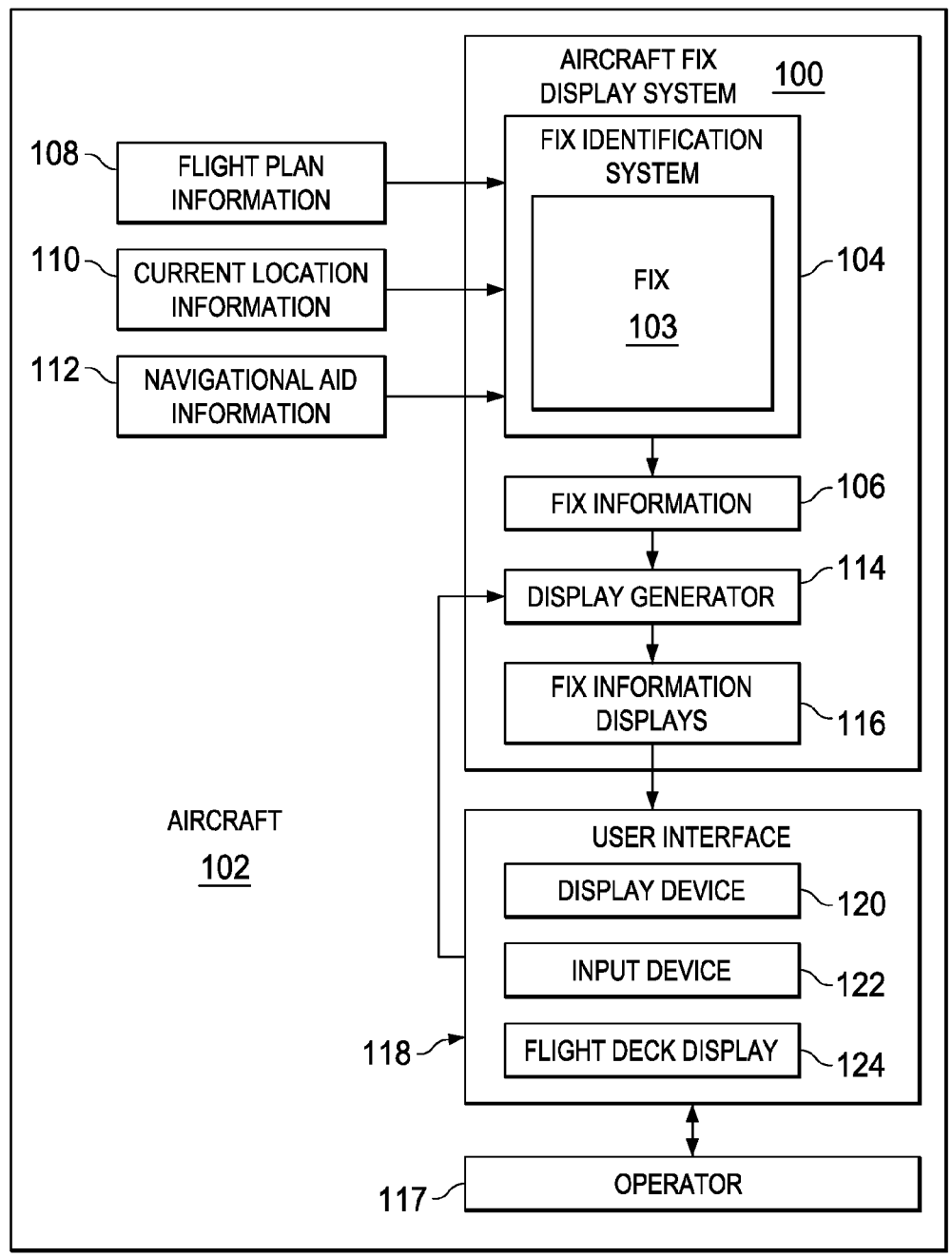
FIG. 1 is an illustration of a block diagram of an aircraft fix display system in accordance with an illustrative embodiment.

Turning now to FIG. 1, an illustration of a block diagram of an aircraft fix display system is depicted in accordance with an illustrative embodiment. The various functions performed by aircraft fix display system 100 may be implemented in a data processing system on aircraft 102. For example, the functions performed by aircraft fix display system 100 may be implemented in software running on a data processing system that may be located on the flight deck or in another location on aircraft 102.

Aircraft 102 may include any type of aircraft. For example, without limitation, aircraft 102 may be a commercial, personal, or military aircraft, or any other type of aircraft configured for any purpose or mission. For example, aircraft 102 may be configured to carry people, cargo, or both. Aircraft 102 may be a fixed wing, rotary wing, or lighter than air aircraft.

In this application, including in the claims, fix 103 refers to information identifying a location of aircraft 102. For example, fix 103 may refer to a current location of aircraft 102, to a location at which aircraft 102 is planned to be located in the future, or to a location at which aircraft 102 was located in the past. For example, without limitation, fix 103 may identify a location specified in a flight plan for aircraft 102. Fix 103 also may be referred to as an airspace fix, a waypoint, a navigation point, or using any other appropriate terminology.

Aircraft fix display system 100 may comprise fix identification system 104. Fix identification system 104 may be configured to identify fix 103 and to generate fix information 106. For example, fix identification system 104 may be configured to identify various characteristics of fix 103. Fix information 106 may include information describing various characteristics of fix 103.

Fix identification system 104 may use various types of information from various sources to identify fix 103 and to generate fix information 106. For example, without limitation, fix identification system 104 may use flight plan information 108, current location information 110, navigational aid information 112, or other information, or various combinations of information, to identify fix 103 and to generate fix information 106.

Flight plan information 108 may include, for example, information describing a planned route of flight for aircraft 102. For example, flight plan information 108 may identify various waypoints on the planned route for aircraft 102. Fix 103 may correspond to one of the waypoints identified in flight plan information 108.

Current location information 110 may include information identifying the current location of aircraft 102. Current location information 110 may be generated or otherwise provided by any appropriate devices or systems on aircraft 102 for identifying the current location of aircraft 102. For example, without limitation, current location information 110 may be used to identify a point on the flight plan described in flight plan information 108 at which aircraft 102 is currently located.

Navigational aid information 112 may include information describing various ground-based radio navigational aids that may be used to identify fix 103. For example, without limitation, navigational aid information 112 may include information identifying locations of ground-based radio navigational aids, information for tuning receivers on aircraft 102 to the radio signals provided by such ground-based radio navigational aids, and any other information as desired for describing any other characteristics of such ground-based radio navigational aids.

Fix information 106 generated by fix identification system 104 may be provided to display generator 114. Display generator 114 may be configured to generate various integrated and interactive fix information displays 116 for displaying fix information 106 to operator 117 in various formats. For example, without limitation, operator 117 may be a pilot, copilot, or other member of the flight crew on aircraft 102.

Fix information displays 116 may be displayed to operator 117 on user interface 118. For example, user interface 118 may include any appropriate display device 120 for displaying fix information displays 116 to operator 117. Operator 117 may interact with fix information displays 116 via user interface 118. For example, user interface 118 may include any appropriate input device 122 for receiving input from operator 117. For example, without limitation, operator 117 may interact with aircraft fix display system 100 via user interface 118 to control the information that is displayed in fix information displays 116 by display generator 114.

User interface 118 may be implemented as part of or separate from aircraft fix display system 100. For example, without limitation user interface 118 may be implemented as flight deck display 124 located on the flight deck of aircraft 102.

Figure 2:
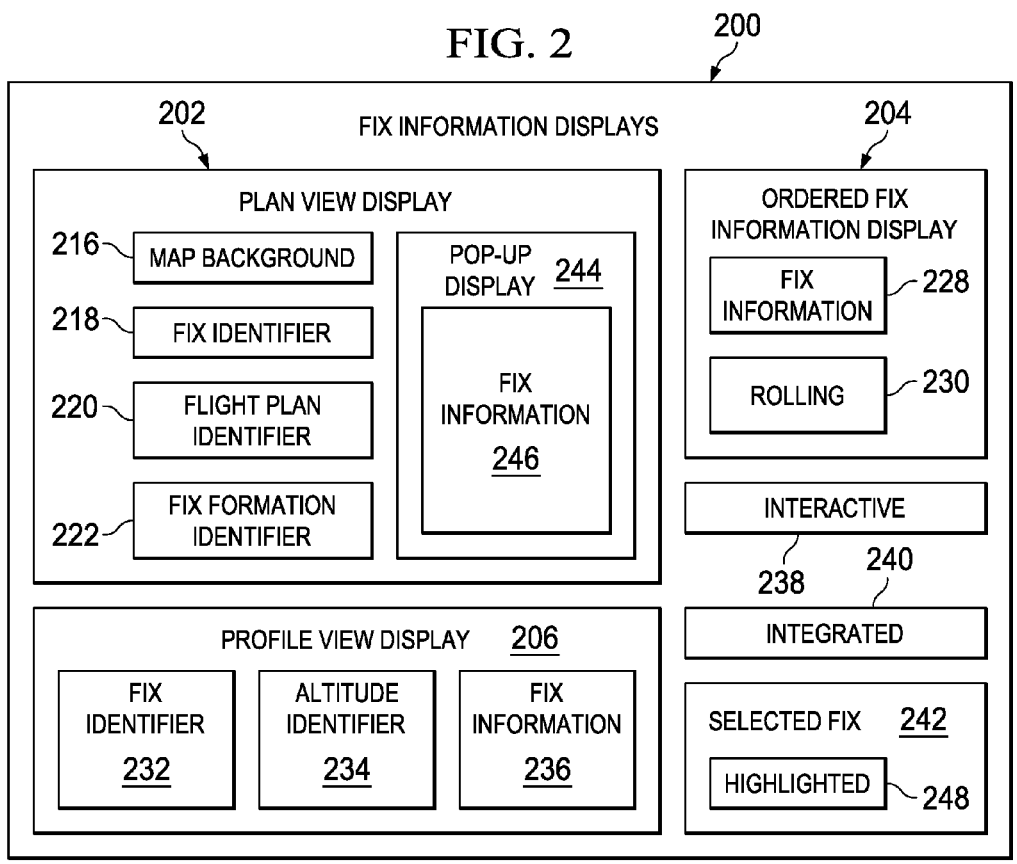
FIG. 2 is an illustration of a block diagram of fix information displays in accordance with an illustrative embodiment.

Turning now to FIG. 2, an illustration of a block diagram of fix information displays is depicted in accordance with an illustrative embodiment. In this example, fix information displays 200 may be an example of one implementation of fix information displays 116 in FIG. 1. In accordance with an illustrative embodiment, fix information displays 200 may include plan view display 202, ordered fix information display 204, profile view display 206, or any combination of one or more of plan view display 202, ordered fix information display 204, and profile view display 206.

Information presented in plan view display 202 may be displayed on map background 216. For example, without limitation, the information presented on map background 216 in plan view display 202 may include fix identifier 218, flight plan identifier 220, and fix formation identifier 222.

Fix identifier 218 in plan view display 202 may be referred to as a first fix identifier. Fix identifier 218 may include any symbol or other appropriate identifier for indicating the location of a fix in plan view display 202. For example, the position of fix identifier 218 on map background 216 in plan view display 202 may indicate the geographic location of a fix.

Flight plan identifier 220 may include any appropriate indication of the planned route of an aircraft in plan view display 202. For example, without limitation, flight plan identifier 220 may include a line on map background 216 in plan view display 202 that may indicate the planned route of flight of an aircraft.

Fix formation identifier 222 may include any appropriate indication of information for ground based radio navigational aids or other navigational aids that may be used for navigation at the location of a fix. For example, without limitation, fix formation identifier 222 may identify the distances from relevant navigational aids to the fix, the directions from relevant navigational aids to the fix, or both. For example, without limitation, fix formation identifier 222 may include a line on map background 216 in plan view display 202 indicating the distance, direction, or both from a navigational aid to the fix. In this example, lines used for fix formation identifier 222 may be displayed in a distinct manner in plan view display 202 to distinguish them from lines used for flight plan identifier 220 in plan view display 202.

Ordered fix information display 204 may include a display of fix information 228 for a plurality of fixes. Fix information 228 may be displayed in ordered fix information display 204 in a desired order. For example, without limitation, ordered fix information display 204 may include fix information 228 for a plurality of fixes associated with a flight plan in the order in which the fixes will be flown. In other words, fix information 228 may be displayed in a chronological order in ordered fix information display 204. Ordered fix information display 204 may be rolling 230, such that the next fix in the flight plan is maintained at the top of ordered fix information display 204. Alternatively, an operator may select the order of fix information 228 displayed in ordered fix information display 204.

Profile view display 206 may include fix identifier 232 identifying a fix and altitude identifier 234 identifying an altitude of the aircraft at the fix identified by fix identifier 232. Fix identifier 232 in profile view display 206 may be referred to as a second fix identifier. Profile view display 206 also may include fix information 236. Fix information 236 may include information describing the characteristics, restrictions, and limitations associated with the fix identified by fix identifier 232. For example, without limitation, fix information 236 may include information indicating a desired altitude for the aircraft at the fix identified by fix identifier 232, a turn direction or heading change to be made by the aircraft at the fix identified by fix identifier 232, or other information associated with the fix identified by fix identifier 232.

The various displays in fix information displays 200 may be interactive 238 and integrated 240. For example, fix information displays 200 may be interactive 238 in that an operator may be allowed to select which of fix information displays 200 are to be displayed at any particular time. Furthermore, fix information displays 200 may be configured to allow an operator to select selected fix 242 from fix information for a plurality of fixes that may be displayed on fix information displays 200.

In response to an operator selecting selected fix 242, pop-up display 244 for selected fix 242 may be displayed in plan view display 202. Fix information 246 for selected fix 242 may be presented in pop-up display 244. For example, without limitation, fix information 246 may include various characteristics, restrictions, or limitations that may be associated with selected fix 242. For example, without limitation, fix information 246 may identify the desired altitude of an aircraft at selected fix 242.

Fix information displays 200 may be integrated 240, for example, such that information identifying selected fix 242 is highlighted 248 on all of fix information displays 200. Information for selected fix 242 may be highlighted 248 in any appropriate manner. For example, without limitation, information for selected fix 242 may be highlighted 248 using different text size, text color, background color, symbol size, symbol color, or other methods or combinations of methods, for distinguishing information for selected fix 242 from information for other fixes that may be displayed on fix information displays 200.

Fix information 246 in plan view display 202, fix information 228 in ordered fix information display 204, and fix information 236 in profile view display 206 may or may not include the same information. In general, fix information 246 displayed in plan view display 202, fix information 228 displayed in ordered fix information display 204, and fix information 236 displayed in profile view display 206 may be selected and presented as appropriate with regard to the different manners in which information is presented in plan view display 202, ordered fix information display 204, and profile view display 206.

The illustrations of FIGS. 1 and 2 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 3:
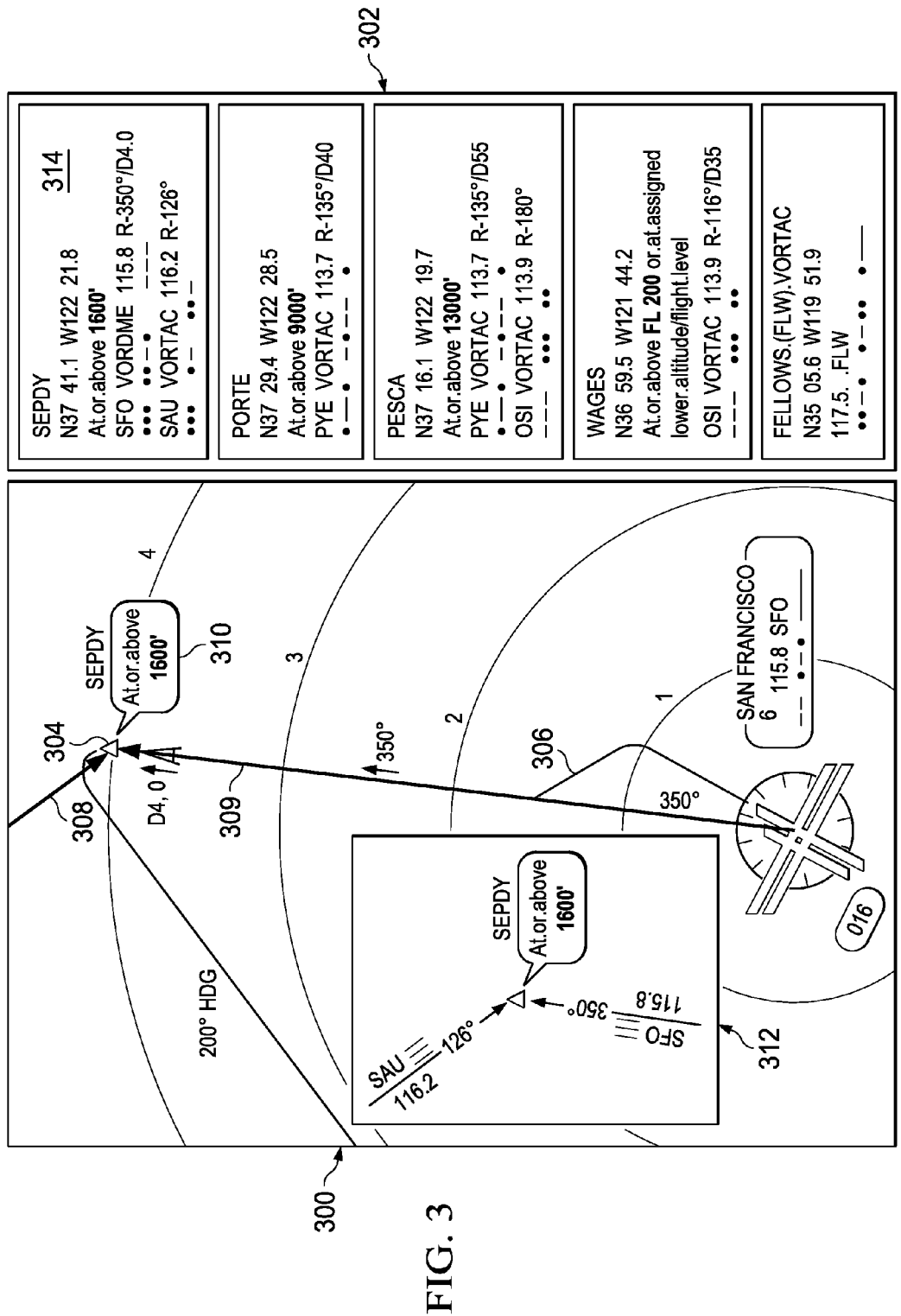
FIG. 3 is an illustration of a plan view display and an ordered fix information display in accordance with an illustrative embodiment.

Turning now to FIG. 3, an illustration of a plan view display and an ordered fix information display is depicted in accordance with an illustrative embodiment. In this example, plan view display 300 is an example of one implementation of plan view display 202 in FIG. 2. Ordered fix information display 302 is an example of on implementation of ordered fix information display 204 in FIG. 2.

Plan view display 300 includes fix identifier 304 identifying the location of a fix in plan view display 300. In this example, fix identifier 304 is a triangle symbol. However, any appropriate symbol may be used for fix identifier 304. In this example, line 306 in plan view display 300 is presented as a flight plan identifier. Line 306 indicates a planned route of flight of an aircraft. In this example, arrows 308 and 309 indicate the fix formation for the fix identified by fix identifier 304. In this case, arrows 308 and 309 provide a fix formation identifier identifying the directions of ground-based radial navigational aids from the fix identified by fix identifier 304.

Fix information describing other characteristics of the fix identified by fix identifier 304 may be presented at location 310 in plan view display 202. Additional fix information for the fix identified by fix identifier 304 may be provided in pop-up display 312 on plan view display 300.

Ordered fix information display 302 may include fix information 314 presented in a desired order in ordered information display 302. For example, fix information 314 for fixes on the route identified by line 306 in plan view display 300 may be displayed in the order of the route on ordered fix information display 302. Ordered fix information display 302 may be a rolling display, such that fix information 314 for the next fix on the route identified by line 306 in plan view display 300 is displayed at the top of ordered fix information display 302.

Figure 4:
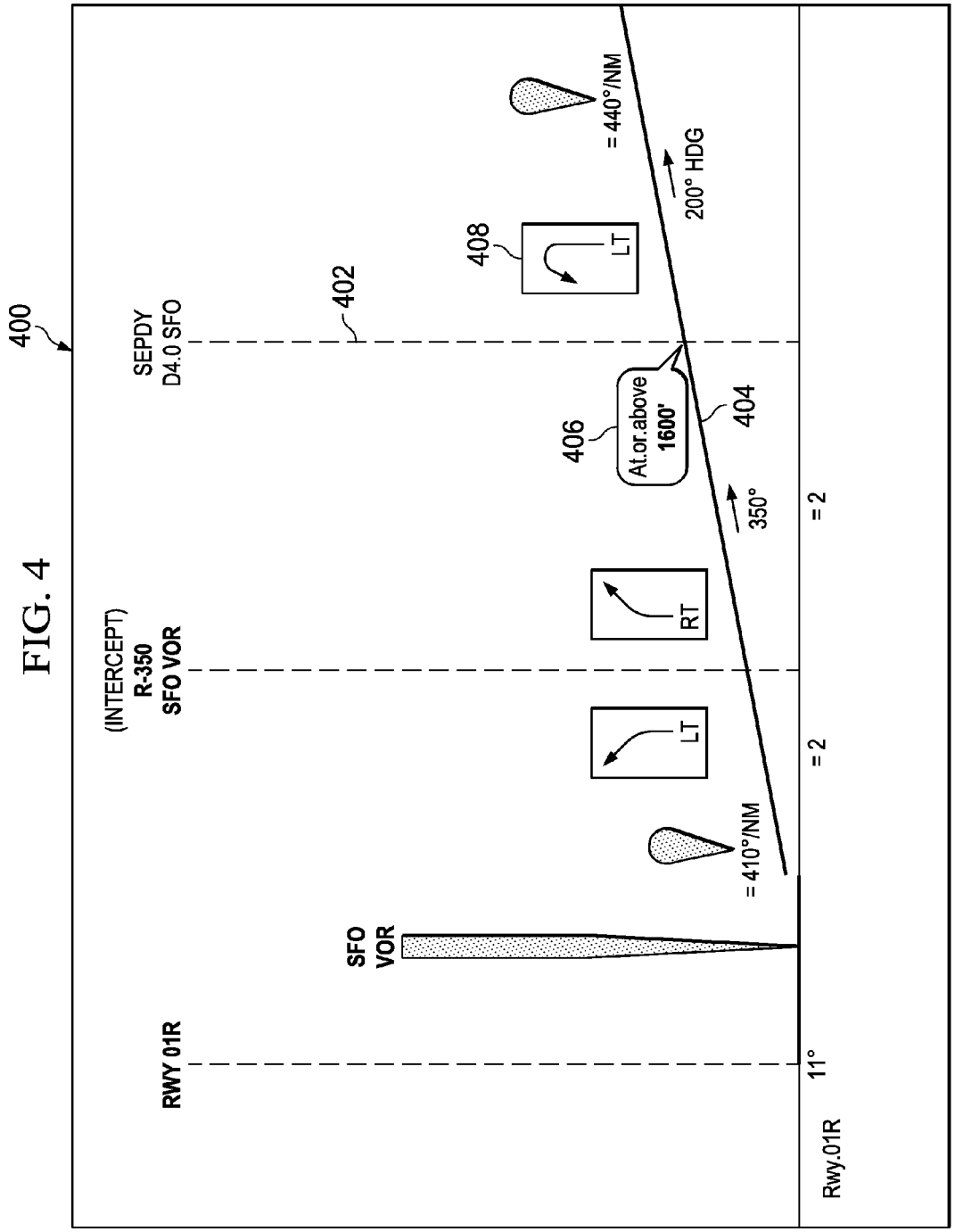
FIG. 4 is an illustration of a profile view display in accordance with an illustrative embodiment.

Turning now to FIG. 4, an illustration of a profile view display is depicted in accordance with an illustrative embodiment. In this example, profile view display 400 is an example of one implementation of profile view display 206 in FIG. 2.

In this example, profile view display 400 includes fix identifier 402 identifying a fix and altitude identifier 404 identifying an altitude of an aircraft with respect to the fix identify by fix identifier 402. Other fix information presented in profile view display 400 may include information 406 indicating any desired altitude for the aircraft at the fix indicated by fix identifier 402 and information 408 identifying a turn direction for the aircraft at the fix identified by fix identifier 402.

Figure 5:
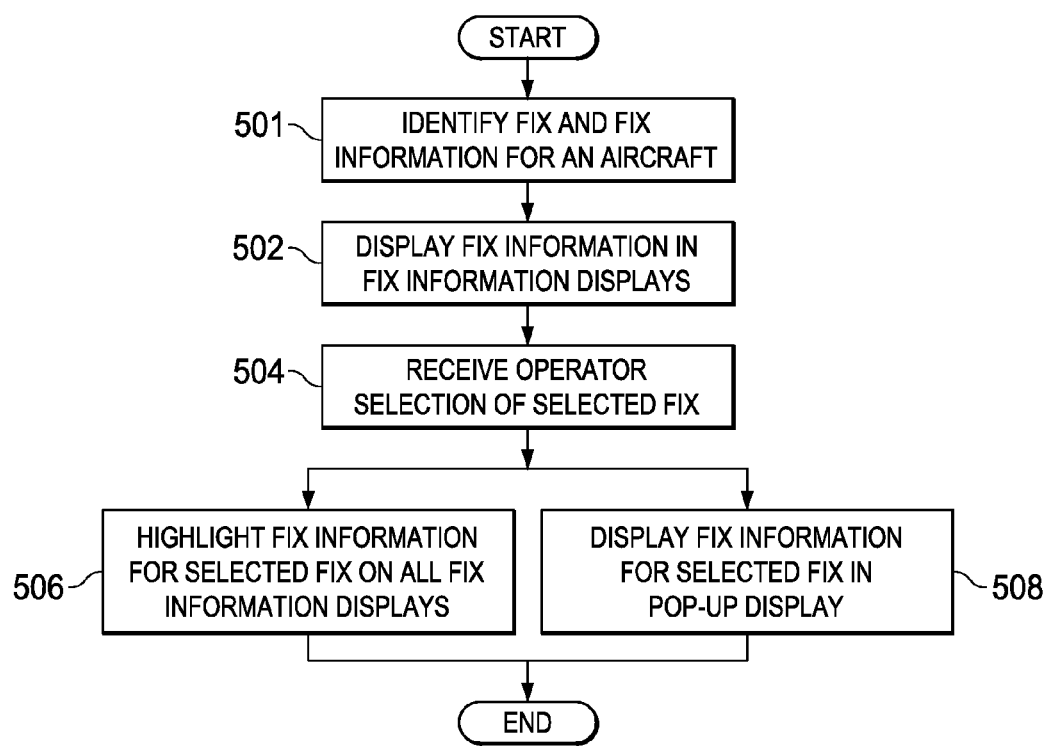
FIG. 5 is an illustration of a flowchart of a process for displaying fix information in accordance with an illustrative embodiment.

Turning now to FIG. 5, an illustration of a flowchart of a process for displaying fix information is depicted in accordance with an illustrative embodiment. In this example, the process illustrated in FIG. 5 may be implemented in aircraft fix display system 100 in FIG. 1.

The process may begin by identifying a fix and fix information for an aircraft (operation 501). The fix information then may be displayed in various fix information displays (operation 502). For example, operation 502 may include displaying the fix information simultaneously on one or more of a plan view display, an ordered fix information display, and a profile view display, or in any combination of such displays.

A selection by an operator of a selected fix may be received (operation 504). For example, the selection by the operator of a selected fix may be received in response to an operator indicating that a fix is the selected fix by interaction with any of the displays on which the fix information for the fix is displayed. In response to receiving the operator selection of the selected fix, fix information for the selected fix may be highlighted on all of the fix information displays (operation 506). Also, in response to receiving the operator selection of the selected fix, fix information for the selected fix may be displayed in a pop-up display (operation 508), with the process terminating thereafter.

Figure 6:
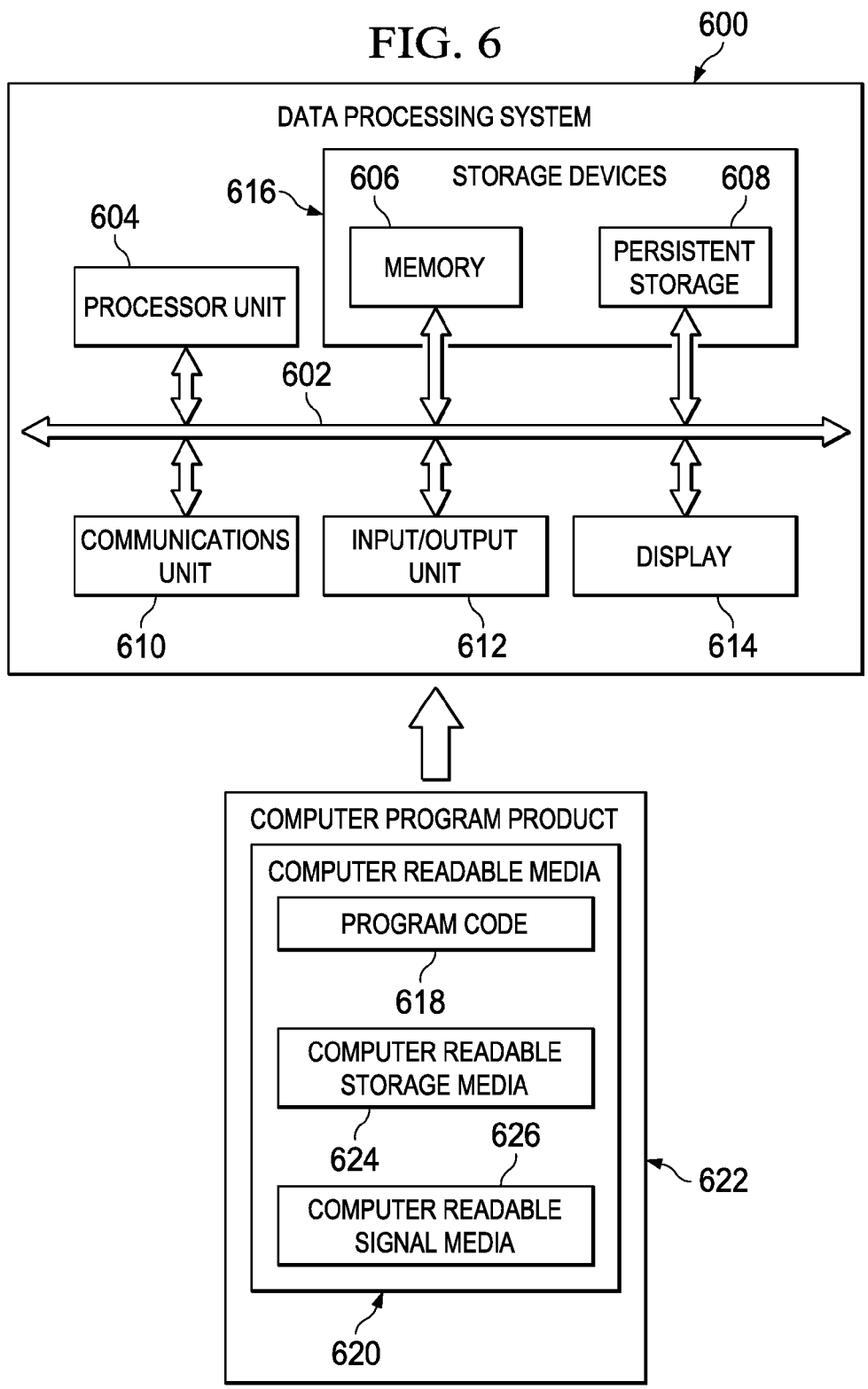
FIG. 6 is an illustration of a block diagram of a data processing system in accordance with an illustrative embodiment.

Turning now to FIG. 6, an illustration of a block diagram of a data processing system is depicted in accordance with an illustrative embodiment. In this example, data processing system 600 is an example of one implementation of a data processing system for implementing aircraft fix display system 100 in FIG. 1.

In this illustrative example, data processing system 600 includes communications fabric 602. Communications fabric 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications fabric 602.

Processor unit 604 serves to run instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and other suitable information either on a temporary basis or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in communications fabric 602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying an aircraft fix, comprising:
   identifying, by a processor, a fix for an aircraft, wherein the fix is a location of the aircraft;
   displaying, by the processor, a fix identifier in a plan view display, wherein the fix identifier indicates a location of the fix on a map background in the plan view display;
   displaying, by the processor, restrictions and limitations for the aircraft for the fix at the location on the map background in the plan view display where the fix is displayed; and
   displaying, by the processor, a fix formation identifier in the plan view display, wherein the fix formation identifier indicates at least one of a distance and a direction from a navigational aid to the fix.

2. The method of claim 1, wherein the fix formation identifier comprises a line indicating the direction from the navigational aid to the fix.

3. The method of claim 1, wherein identifying, by the processor, the fix comprises identifying the fix from flight plan information, and wherein the fix comprises a point on a planned route for the aircraft defined in the flight plan information, and further comprising:

displaying, by the processor, a flight plan identifier on the plan view display, wherein the flight plan identifier indicates the planned route on the plan view display.

4. The method of claim 1 further comprising:
displaying, by the processor, fix information for the fix in a pop-up display on the plan view display.

5. The method of claim 1 further comprising:
displaying, by the processor, fix information for the fix in an ordered fix information display separate from the plan view display.

6. The method of claim 5, wherein the fix information is displayed in a chronological order in the ordered fix information display, the fix information displayed in the ordered fix information display includes a plurality of different types of fix information, and the ordered fix information display shows the fix information as a rolling list of a plurality of fixes for a planned route of the aircraft.

7. The method of claim 6, wherein the fix information for a next fix for the aircraft is automatically positioned at a top of the ordered fix information display, wherein the chronological order is a sequence in which upcoming fixes of the plurality of fixes are to be flown by the aircraft.

8. The method of claim 5, wherein the fix identifier in the plan view display is a first fix identifier and further comprising:
displaying, by the processor, a second fix identifier in a profile view display and displaying restrictions and limitations for the aircraft for the second fix at the location of the second fix in the profile view display, wherein the second fix identifier indicates an altitude of the aircraft at the fix in the profile view display.

9. The method of claim 8 further comprising:
highlighting, by the processor, the first fix identifier in the plan view display, highlighting, by the processor, the fix information in the ordered fix information display, and highlighting, by the processor, the second fix identifier in the profile view display in response to an operator indicating that the fix is a selected fix.

10. An apparatus, comprising:
a fix identification system configured to identify a fix for an aircraft, wherein the fix is a location of the aircraft; and
a display generator configured to display a fix identifier in a plan view display, display restrictions and limitations for the aircraft for the fix at the location in the plan view display where the fix is displayed, and a fix formation identifier in the plan view display, wherein the fix identifier indicates a location of the fix on a map background in the plan view display, and wherein the fix formation identifier indicates at least one of a distance and a direction from a navigational aid to the fix.

11. The apparatus of claim 10, wherein the fix formation identifier comprises a line indicating the direction from the navigational aid to the fix.

12. The apparatus of claim 10, wherein:
the fix identification system is configured to identify the fix from flight plan information, wherein the fix comprises a point on a planned route for the aircraft defined in the flight plan information; and
the display generator is configured to display a flight plan identifier on the plan view display, wherein the flight plan identifier indicates the planned route on the plan view display.

13. The apparatus of claim 10, wherein the display generator is further configured to display fix information for the fix in a pop-up display on the plan view display.

14. The apparatus of claim 10, wherein the display generator is further configured to display fix information for the fix in an ordered fix information display separate from the plan view display.

15. The apparatus of claim 14, wherein the display generator is configured to display the fix information in a chronological order in the ordered fix information display, the fix information displayed in the ordered fix information display includes a plurality of different types of fix information, and the ordered fix information display shows the fix information as a rolling list of a plurality of fixes for a planned route of the aircraft.

16. The apparatus of claim 15, wherein the display generator is configured to display automatically the fix information for a next fix for the aircraft at a top of the ordered fix information display, wherein the chronological order is a sequence in which upcoming fixes of the plurality of fixes are to be flown by the aircraft.

17. The apparatus of claim 14, wherein the fix identifier in the plan view display is a first fix identifier and wherein the display generator is further configured to display a second fix identifier in a profile view display and display the restrictions and limitations for the aircraft for the second fix at the location of the second fix in the profile view display, wherein the second fix identifier indicates an altitude of the aircraft at the fix in the profile view display.

18. The apparatus of claim 17, wherein the display generator is further configured to highlight the first fix identifier in the plan view display, highlight the fix information in the ordered fix information display, and highlight the second fix identifier in the profile view display in response to an operator indicating that the fix is a selected fix.

19. An aircraft fix information display, comprising:
a plan view display comprising a first fix identifier indicating a location of a fix on a map background, a first indication of restrictions and limitations for the aircraft for the fix at the location on the map background where the first fix identifier is located, and a fix formation identifier indicating at least one of a distance and a direction from a navigational aid to the fix, wherein the fix is a location of an aircraft;
an ordered fix information display comprising a display of fix information for the fix in a desired order, wherein the fix information displayed in the ordered fix information display includes a plurality of different types of fix information, and the ordered fix information display shows the fix information as a rolling list of a plurality of fixes for a planned route of the aircraft; and
a profile view display comprising a second fix identifier indicating an altitude of the aircraft at the fix in the profile view display and a second indication of restrictions and limitations for the aircraft for the second fix at the location of the second fix in the profile view display.

20. The aircraft fix information display of claim 19, wherein the first fix identifier in the plan view display, the fix information in the ordered fix information display, and the second fix identifier in the profile view display are highlighted in response to an operator indicating that the fix is a selected fix.

* * * * *